UNITED STATES PATENT OFFICE.

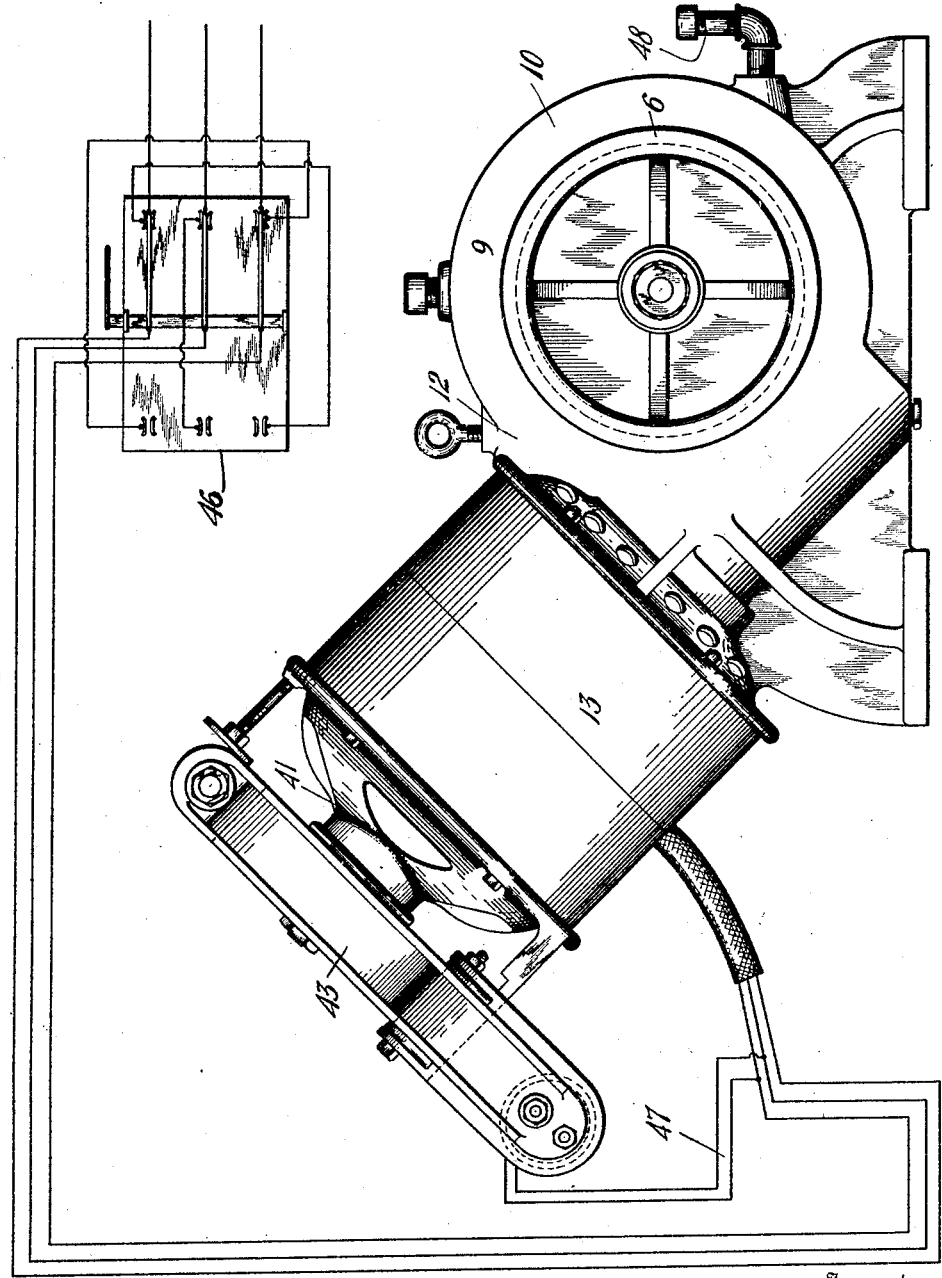

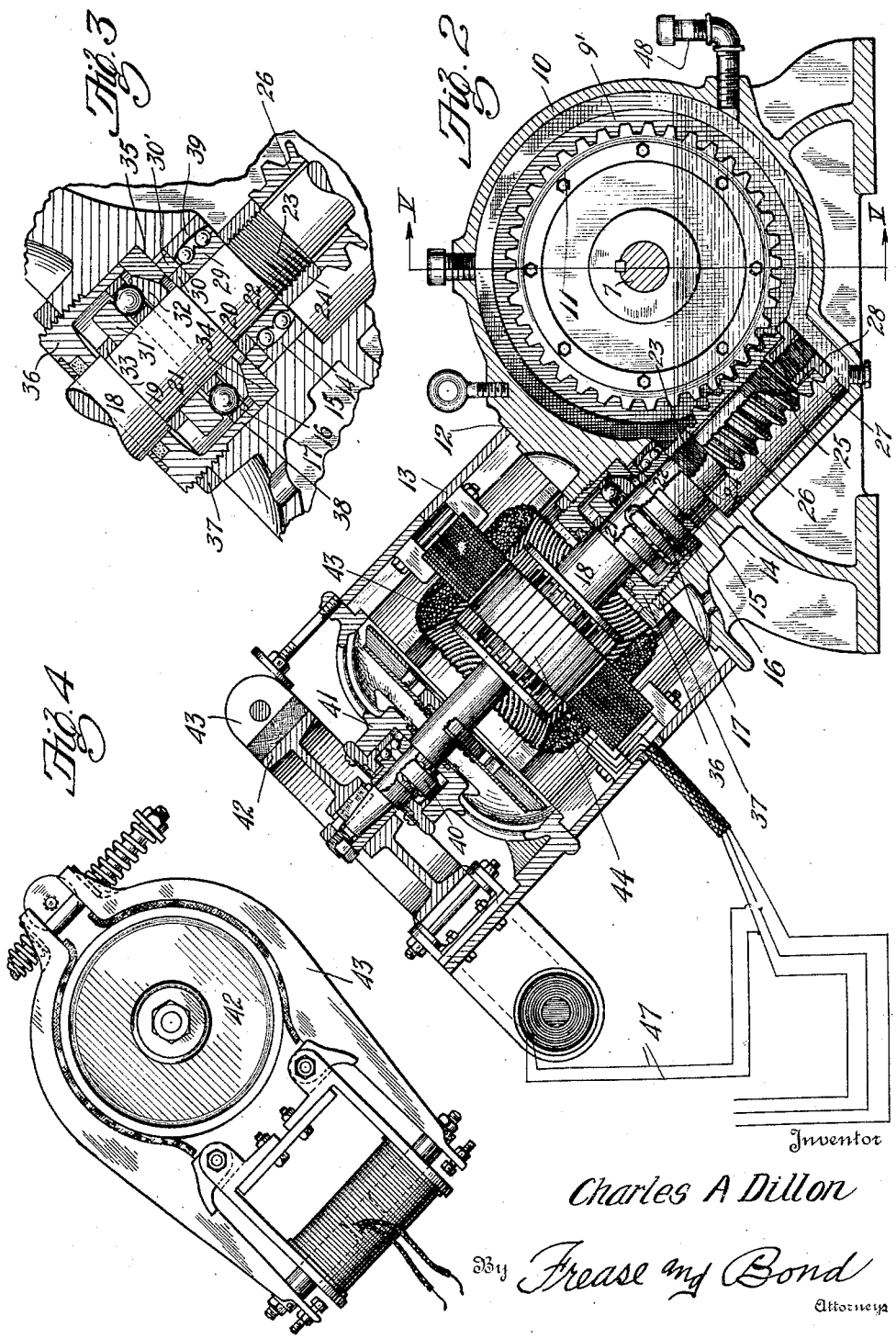

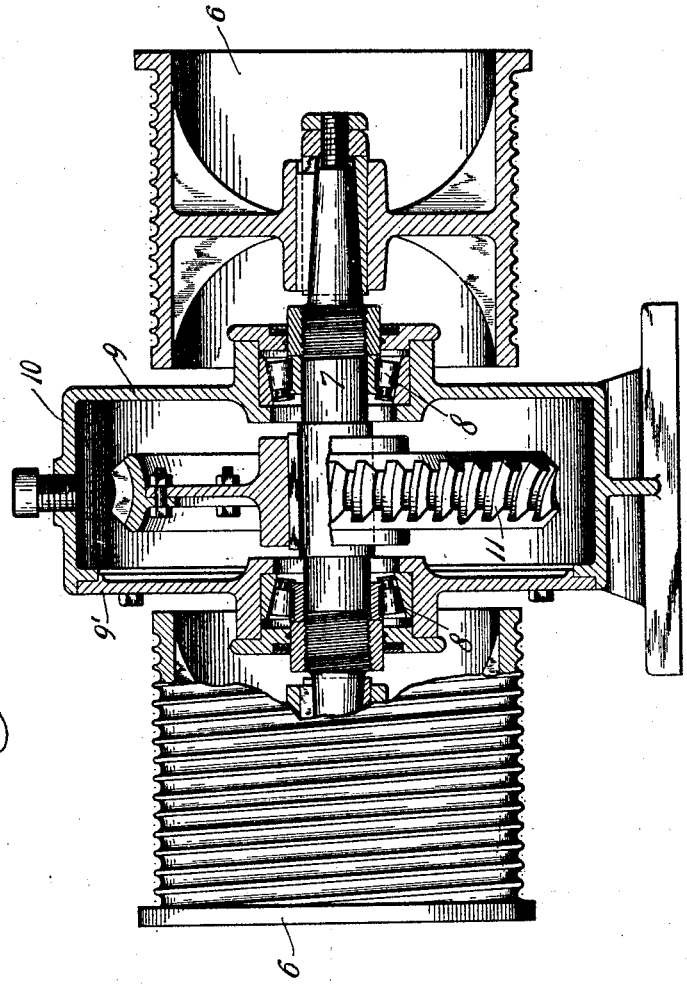

CHARLES A. DILLON, OF CANTON, OHIO, ASSIGNOR TO THE DILLON ELECTRIC COMPANY, OF CANTON, OHIO, A CORPORATION.

ELECTRIC ELEVATOR.

1,410,285. Specification of Letters Patent. Patented Mar. 21, 1922.

Application filed December 21, 1921. Serial No. 523,927.

*To all whom it may concern:*

Be it known that I, CHARLES A. DILLON, a citizen of the United States, residing at Canton, in the county of Stark, and State of Ohio, have invented new and useful Improvements in Electric Elevators, of which the following is a specification.

The invention relates to electric motors for driving the cable drums for elevators and other hoisting apparatus; and the objects of the improvement are to form the gear and motor cases in a unitary structure, wherein all the principal bearings are carried and may be run in oil or other liquid lubricant which cannot flow into the motor case.

The object of the invention is obtained by using a worm gear for the cable drums, by mounting the gear worm upon an obliquely inclined motor spindle, and by shaping the gear case to form one head of the motor case, in which head is carried the main radial and thrust bearing for the motor spindle.

Ancillary objects are attained by the location, construction and operation of the spindle bearings in the gear case, whereby the load thrust of the spindle is transmitted to the case by an end thrust bearing, and such counter thrust as there may be, is transmitted to the case through the main radial bearing.

Figure 1 is a side elevation of the motor and gear cases;

Fig. 2, an elevation section of the same in the axis of the motor;

Fig. 3, a fragmentary enlarged section of the main radial and thrust bearings;

Fig. 4, a plan view of the magnetic brake; and

Fig. 5, a section of the gear case in the axis of the drums, on line 5—5, Fig. 2.

Similar numerals of reference indicate corresponding parts throughout the drawings.

The cable drums 6 are secured on the ends of a gear spindle 7 which turn in tapered roller bearings 8 in the heads 9 and 9' of the gear case 10, inside of which a worm gear 11 is keyed upon the gear spindle. On one peripheral side of the motor case is formed one head 12 for the motor case 13, and in the same side of the gear case is formed a smaller aperture 14 for the main radial bearing 15 and a larger aperture 16 for the thrust bearing 17 of the motor spindle 18, which spindle is located at an oblique angle of about 45° extending tangentially upward and outward from under the gear wheel.

The motor spindle 18 is twice reduced in diameter to form bearing shoulders 19 and 20, and the bearing sections 21 and 22, below which are formed the threads 23 for the lock collar 24 and the thread 25 for the worm 26; and the lower end of the spindle is further reduced to form the screw shank 27 for the lock nut 28.

The inner race ring 29 of the radial bearing 15 and the inner one of two spacing collars 30 and 30' are mounted on the bearing section 22 of the motor spindle, and are clamped between the shoulder 20 and the lock collar 24 thereon; and the tubular worm 26 is screwed upon the threads 25 against the lock collar 24 and is locked in position by the nut 28 on the end of the spindle.

The upper and lower race rings 31 and 32 for the thrust bearing 17 are mounted around the bearing section 21 of the motor spindle, the upper ring 31 turning with the spindle, and the lower ring 32 being relatively stationary. These race rings are positioned between the spacing collar 33 bearing above against the spindle shoulder 19, and the self aligning collar 34 bearing below upon the annular shoulder 35 at the bottom of the larger bearing recess 16; so that the downward thrust of the spindle is carried by the bearing head 12 of the motor case formed by the wall of the gear case.

The foregoing parts are mounted and secured upon the motor spindle before the same in inserted through the apertures in the bearing head 12, whereupon all these parts are secured in position by means of the retaining collar 36 which is screwed into the larger bearing aperture 16 and locked in position by a ring nut 37. The retaining collar 36 stands free of the spacing collar 33, and is provided with a sleeve extension 38 bearing upon the self-aligning collar 34 and clamps the same against the bearing shoulder 35, and also receives and stops any upward thrust there may be communicated through the self-aligning collar 34 and the spacing collar 30; from the outer race ring 39 of the radial bearing.

The upper end of the motor spindle 18 is provided with a radial bearing 40 mounted in the upper head 41 of the motor case; above which the drum 42 of a magnetic brake 43 is keyed to the extremity of the shaft; which brake operates in the usual manner for controlling elevating or hoist mechanism.

Suitable motor elements are mounted in the motor case and, as shown, may form a squirrel cage induction motor, including the stator winding 43 and core mounted in the case and the rotor 44 mounted on the spindle; the winding being connected with conductors for a three-phase alternating current controlled by a reversing switch 46, there being shunt conductors 47 leading to the magnetic brake.

The gear case 10 is filled with oil or other liquid lubricant to or near the under side of the gear spindle 7, so as to overflow the lower sides of the gear spindle bearings 8, the main radial bearing 15, and the thrust bearing 17 of the motor spindle, to constantly lubricate the same as well as the worm gear.

In the operation of the mechanism for elevating or hoisting, it is evident that a downward pull upon the worm and motor spindle is resisted by the thrust bearing and sustained by the oblique bearing head 12 formed in the periphery of the gear case and comprising the lower head of the motor case; and that any upward thrust of the worm and motor spindle caused by a counterbalance of the load or elevator is resisted by the radial bearing, and is ultimately sustained by the same head through the retaining collar 36.

It is furthermore evident that the construction and arrangement of the parts makes a self-contained mechanism in which all the cable drum, worm gear, motor and brake elements are carried upon a single base as a unitary structure; and in which all the bearings, excepting only the upper minor radial bearing for the motor spindle, are constantly lubricated by oil or the like, which may be introduced through a supply pipe 48; and that the upper outward oblique inclination of the motor spindle brings the opening of the bearing apertures therefor above the level of the lubricant and prevents the same from entering the motor case to the detriment of the motor elements located therein.

I claim:

1. Electric elevator mechanism including a gear case with a worm gear therein, a motor case on the side of the gear case having an oblique head formed by the peripheral wall thereof, a bearing in the oblique head and a motor spindle journaled in the bearing extending tangentially upward and outward from under the gear wheel and having a worm on its lower end in mesh therewith.

2. Electric elevator mechanism including a gear case with a worm gear therein, a motor case on the side of the gear case having an oblique head formed by the peripheral wall thereof, a radial bearing and a thrust bearing in the oblique head and a motor spindle journaled in the bearings extending tangentially upward and outward from under the gear wheel and having a worm on its lower end in mesh therewith.

3. Electric elevator mechanism including a gear case with bearings in its ends, a spindle journaled in the bearings having a worm gear thereon, a motor case on the side of the gear case, the peripheral wall of the gear case being shaped to form an oblique head for the motor case, a bearing in the oblique head and a motor spindle journaled in the bearing extending tangentially upward and outward from under the gear wheel and having a worm on its lower end in mesh therewith.

4. Electric elevator mechanism including a gear case with bearings in its ends, a spindle journaled in the bearings having a worm gear thereon, a motor case on the side of the gear case, the peripheral wall of the gear case being shaped to form an oblique head for the motor case, a radial bearing and a thrust bearing mounted in the oblique head and a motor spindle journaled in the bearings extending tangentially upward and outward from under the gear wheel and having a worm on its lower end in mesh therewith.

5. Electric elevator mechanism including a gear case with a worm gear therein, a motor case on the side of the gear case having a head formed by the peripheral wall thereof, a bearing aperture in the head with an annular shoulder therein, a self-aligning collar bearing on the shoulder, a motor spindle extending through the aperture with a worm on its inner end in mesh with the worm gear, a radial bearing in the aperture inside the shoulder, a thrust bearing in the aperture on the self-aligning collar, and a retaining collar screwed into the aperture having a sleeve extension clamped against the self-aligning collar.

CHARLES A. DILLON.